United States Patent Office 3,751,514
Patented Aug. 7, 1973

3,751,514
PREPARATION OF ISOBUTYLENE AND
PROPYLENE FROM ISOBUTANE
Frederic H. Hoppstock, Akron, and Jeffrey A. Goodwin and Kenneth J. Frech, Tallmadge, Ohio, assignors to The Goodyear Tire & Rubber Company, Akron, Ohio
No Drawing. Continuation of abandoned application Ser. No. 861,142, Sept. 25, 1969. This application June 21, 1971, Ser. No. 155,287
Int. Cl. C07c 3/28, 5/18; C10g 11/06, 11/08
U.S. Cl. 260—683.3                                      6 Claims

ABSTRACT OF THE DISCLOSURE

There is disclosed a process for the simultaneous preparation of isobutylene and propylene from isobutane in the presence of a homogeneous catalyst system. Hydrogen sulfide, methyl mercaptan, ammonium hydrosulfide, ammonium bromide and ammonium sulfide are disclosed as representative examples of the homogeneous catalyst system employed.

RELATED APPLICATION

This application is a continuation of Ser. No. 861,142, now abandoned.

BACKGROUND OF THE INVENTION

This invention is directed to the simultaneous preparation of isobutylene and propylene from isobutane. More specifically, it is directed to the simultaneous preparation of isobutylene and propylene by pyrolysis of isobutane in the presence of a homogeneous catalyst.

Most of the propylene employed for industrial chemical purposes is obtained by two methods. The first and by far the largest source of propylene is by-product propylene. The term "by-product propylene" means that the propylene is obtained from operations aimed primarily at other major products. A major source of "by-product propylene" is that propylene which is obtained from refinery sources. This propylene comes from the catalytic cracking and reforming operations in the refinery, aimed at making gasoline. It must be recovered from low boiling hydrocarbon streams and such procedures involve low temperature distillation, scrubbing to remove certain impurities, gas compression and the like. The economics and availability of such propylene is related not only to the chemical and physical steps needed to recover and concentrate it but also the refinery's need for propylene to make gasoline. Propylene can be used in making both alkylate and polymer gasoline.

Another source of by-product propylene is from naphtha cracking operations and propane cracking operations. In naphtha cracking operations, however, the product primarily aimed for is ethylene. Therefore, in a naphtha cracking operation the price and availability of propylene is tied directly to the price of ethylene. This source of propylene can, too, be rather expensive and undependable.

Propylene obtained by propane pyrolysis is also practiced in the art. However, when propane is cracked the primary aim is, again, ethylene. Thus, the price and availability of this propylene is also tied directly to the economics of the ethylene.

Methods are known which are specifically aimed at propylene production which involve the use of heterogeneous catalysis. There is little propylene manufactured by such processes in the world, the reason being that plant investment is very high due to the cyclic nature required by the regeneration of the catalyst. Such a process must be operated at high dilution and low partial pressures and, therefore, increasing heat costs and reducing throughput and production.

Thus, it can be said that there are very few processes aimed at obtaining propylene directly. Most of the propylene used for chemical purposes is obtained as by-product propylene.

Isobutylene, on the other hand, can be considered as available from by-product sources and direct sources.

Gasoline manufacturing operations lead to large quantities of isobutylene. Processes such as catalytic cracking of gas oils, kerosene, and catalytic reforming lead to isobutylene. This isobutylene must be extracted or separated from a myriad of other compounds boiling at temperatures near that of isobutylene. This requires some sophistication in the distillation or separation processes and leads to higher cost. Isobutylene in a refinery is a much-sought-after product. It is used as an alkylation feedstock for making alkylate, a high octane gasoline component.

There are known direct methods for making isobutylene. For instance, the catalytic dehydrogenation of isobutane will lead to isobutylene. The dehydrogenation of isobutane using solid catalysts is not attractive for several reasons. First of all, plant investments are high, conversions per pass are low due to thermodynamic considerations, and the reaction selectivity to isobutylene is not good. Operating costs are high due to the cyclic nature of such processes and the requirements for catalyst regeneration.

The thermocracking of isobutane also leads to isobutylene. This method is probably the best present method of producing isobutylene directly.

The thermocracking of gas oil and heavy gasoline leads to the formation of some isobutylene, also, however, the primary disadvantage of this method is that a large number of other products are made simultaneously. This means, of course, that to obtain such isobutylene in acceptable purity would lead to high costs, due to both purification and raw material requirements.

It is, therefore, the object of this invention to provide a low cost process for the preparation of both isobutylene and propylene simultaneously from isobutane. Other objects will become apparent as the description proceeds.

This invention is a process for the simultaneous production of isobutylene and propylene which comprises pyrolyzing isobutane in the presence of a homogeneous catalyst system.

The homogeneous catalysts which are employed to produce isobutylene and propylene by the pyrolysis of isobutane are those materials which, when added to the feedstock, enhance the pyrolysis to form isobutylene and propylene. They must be materials which produce isobutylene and propylene in good per pass yields and in good selectivities. They also must be readily available and must be fairly inexpensive. Representative of the homogeneous catalysts useful in this invention are: hydrogen sulfide, methyl mercaptan, ethyl mercaptan, alkyl sulfides, other alkyl mercaptans, bromine, ammonium bromide, hydrogen bromide, methylene chloride, ammonium hydrosulfide, ammonium sulfide, and ammonium polysulfide. Also useful are the reaction product of one mole of hydrogen sulfide with at least one mole of an amine. Representative of this class of materials are methylamine hydrosulfide resulting from one mole of hydrogen sulfide and one mole of methylamine. When two moles of methylamine are reacted with one mole of hydrogen sulfide, methylamine sulfide is formed.

The pyrolysis of isobutane in the presence of a homogeneous catalyst to form isobutylene and propylene is straightforward and requires no special techniques. For instance, temperatures ranging from about 500° C. to about 900° C. may be employed in this pyrolysis process. A more preferred range of temperature is from about 600° C. to about 800° C. with about 625° C. to about 725° C. being more preferred. The residence time in the reactor may vary from about 0.01 to about 10 seconds with even shorter times such as 0.2 to about 5 seconds being more preferred and even from 0.5 to about 2.0 seconds being most preferred. The pressures at which the pyrolysis of this invention is conducted can vary widely from a subatmospheric pressure of 10 mm. Hg or lower to about 500 pounds per square inch gauge (p.s.i.g.) pressure ranging from 100 mm. Hg. to 200 p.s.i.g. being more preferred and 200 mm. Hg to about 150 p.s.i.g. being most preferred.

A diluent may be employed but it is not necessary. Examples of suitable diluents are steam, nitrogen, methane and other inert gases. When a diluent is employed, the mole ratio of diluent to isobutane may vary from 0 to 25 or more. However, it should be understood that the larger the amount of diluent employed the more expensive the process will become due to the higher heat requirements.

The amounts of homogeneous catalysts employed in the pyrolysis of isobutane of this invention may vary widely, from about 0.1 to about 100 mole percent of catalyst per mole of isobutane. However, a more effective amount is from 1 to 50 mole percent, with from 2 to 25 mole percent being more preferred.

The practice of this invention is further illustrated by reference to the following examples which are intended to be representative rather than restrictive of the scope of this invention.

EXAMPLES

These examples, which were continuous, were run in a small pyrolysis reactor equipped with an automatic temperature sensing and control device. There were two preheaters employed, ahead of the reactor, one for the diluent which was steam and one for the isobutane.

The procedure employed was to determine the desired temperature and residence time and set the flow rates of both the diluent and the isobutane to give the desired residence time and ratio to each other. The reactor temperature control was then set at the desired temperature and the two preheaters were then set at a temperature to maintain the proper temperature of the mixture in the pyrolysis reactor. The temperature of both pre-heaters and the reactor was switched to automatic control based on internal thermocouple sensing and allowed to arrive at the on-stream conditions. After the desired on-stream conditions were obtained, the product was directed into the receiver vessel and analyzed by conventional vapor phase chromatographic and mass spectographic techniques.

In these experiments, steam was used as a diluent at a mole ratio of diluent to isobutane of approximately 3 to 1. The results are reported in the tables below where column 1 is the experiment number; column 2 is the pyrolysis temperature in degrees centigrade; column 3 is the residence time in seconds; column 4 is the amount and type of homogeneous catalyst employed, if any, reported in mole percent based on the isobutane charged; column 5 is the conversion and is the mole percent of isobutane converted per pass; column 6 is the selectivity to isobutylene in mole percent, employing conventional recycle techniques and column 7 is the selectivity to propylene in mole percent, employing conventional recycle techniques.

In Table 1 are reported experiments in which the conversions varied from 21 to 48 when no catalyst was employed, but increased from 31 to 63 when a catalyst was employed. It can also be seen that the selectivity to isobutylene and propylene increased considerably when a catalyst was used.

TABLE 1

| Experiment No. | Temp., °C. | Residence time | Catalyst, mole percent | Conv., mole percent | Reaction selectivity | |
|---|---|---|---|---|---|---|
| | | | | | Isobutylene | Propylene |
| 1 | 750 | 0.23 | None | 29 | 34 | 42 |
| 2 | 750 | 0.20 | H$_2$S 10.0 | 58 | 54 | 36 |
| 3 | 725 | 0.47 | None | 37 | 38 | 41 |
| 4 | 725 | 0.47 | H$_2$S 10.0 | 63 | 53 | 36 |
| 5 | 700 | 0.47 | None | 28 | 36 | 43 |
| 6 | 700 | 0.51 | H$_2$S 10.0 | 44 | 56 | 33 |
| 7 | 675 | 1.23 | None | 48 | 39 | 43 |
| 8 | 675 | 0.98 | H$_2$S 10.0 | 47 | 57 | 34 |
| 9 | 650 | 1.05 | None | 21 | 35 | 42 |
| 10 | 650 | 1.02 | H$_2$S 10.0 | 31 | 62 | 35 |

In Table 2 are reported results of additional experiments which illustrate the advantages of the invention.

TABLE 2

| Experiment No. | Temp., °C. | Residence time | Catalyst, mole percent | Conv., mole percent | Reaction selectivity | |
|---|---|---|---|---|---|---|
| | | | | | Isobutylene | Propylene |
| 1 | 700 | 0.95 | H$_2$S 10.0 | 74 | 53 | 34 |
| 2 | 700 | 0.71 | H$_2$S 10.0 | 63 | 53 | 36 |
| 3 | 700 | 0.94 | None | 53 | 34 | 41 |
| 4 | 685 | 0.96 | H$_2$S 10.0 | 64 | 56 | 35 |
| 5 | 700 | 1.17 | None | 59 | 35 | 42 |
| 6 | 762 | 0.49 | ...do... | 69 | 29 | 40 |
| 7 | 762 | 0.44 | ...do... | 64 | 31 | 42 |
| 8 | 700 | 0.96 | H$_2$S 5.0 | 69 | 52 | 36 |
| 9 | 650 | 1.10 | H$_2$S 5.0 | 28 | 60 | 34 |
| 10 | 675 | 1.02 | (NH$_4$)$_2$S 10.0 | 45 | 56 | 35 |

While certain representative embodiments and details have been shown for the purpose of illustrating the invention it will be apparent to those skilled in this art that various changes and modifications may be made therein without departing from the spirit or scope of the invention.

What is claimed is:

1. A process for the simultaneous production of isobutylene and propylene which comprises continuously pyrolyzing isobutane, at temperatures ranging from about 500° C. to about 900° C. for times ranging from 0.2 to about 5 seconds, at pressures ranging from about 10 mm. Hg to 500 p.s.i.g., while the isobutane is in the presence of a homogeneous catalyst selected from the group consisting of ammonium bromide, ammonium sulfide, ammonium hydrosulfide and ammonium polysulfide, said homogeneous catalyst being employed in amounts ranging from 2 to 25 mole percent based on the amount of isobutane.

2. The process according to claim 1 in which the homogeneous catalyst is ammonium bromide.

3. The process according to claim 1 in which the homogeneous catalyst is ammonium sulfide.

4. The process according to claim 1 in which the homogeneous catalyst is ammonium hydrosulfide.

5. The process according to claim 1 in which the homogeneous catalyst is ammonium polysulfide.

6. The process according to claim 1 in which the temperature ranges from about 600° C. to about 800° C.

(References on following page)

References Cited

UNITED STATES PATENTS

| | | | |
|---|---|---|---|
| 2,415,477 | 2/1947 | Folkins et al. | 260—683 |
| 3,366,703 | 1/1968 | Frech | 260—680 |
| 2,397,638 | 4/1946 | Bell et al. | 260—683 |
| 3,308,182 | 3/1967 | Gabliks et al. | 260—680 |

DELBERT E. GANTZ, Primary Examiner

G. E. SCHMITKONS, Assistant Examiner

U.S. Cl. X.R.

108—113, 115; 260—677 XA, 683 R